United States Patent
Hsu

(10) Patent No.: US 9,686,489 B2
(45) Date of Patent: Jun. 20, 2017

(54) IMAGE SENSOR AND IMAGING SYSTEM ADOPTING ANALOG BUFFER

(71) Applicant: PIXART IMAGING INC., Hsin-Chu County (TW)

(72) Inventor: En-Feng Hsu, Hsin-Chu County (TW)

(73) Assignee: PIXART IMAGING INC., Hsin-Chu County (TW)

( * ) Notice: Subject to any disclaimer, the term of this patent is extended or adjusted under 35 U.S.C. 154(b) by 0 days.

(21) Appl. No.: 14/962,230

(22) Filed: Dec. 8, 2015

(65) Prior Publication Data

US 2017/0013210 A1 Jan. 12, 2017

Related U.S. Application Data

(63) Continuation-in-part of application No. 14/826,620, filed on Aug. 14, 2015.

(30) Foreign Application Priority Data

Aug. 28, 2014 (TW) .............................. 103129797 A
Jul. 10, 2015 (TW) .............................. 104122501 A

(51) Int. Cl.
| | |
|---|---|
| H04N 5/357 | (2011.01) |
| H04N 5/353 | (2011.01) |
| H04N 5/355 | (2011.01) |
| H04N 5/369 | (2011.01) |
| H04N 5/376 | (2011.01) |
| H04N 5/378 | (2011.01) |
| H04N 5/14 | (2006.01) |

(52) U.S. Cl.
CPC ............ *H04N 5/357* (2013.01); *H04N 5/144* (2013.01); *H04N 5/3532* (2013.01); *H04N 5/3559* (2013.01); *H04N 5/3698* (2013.01); *H04N 5/378* (2013.01); *H04N 5/3765* (2013.01)

(58) Field of Classification Search
None
See application file for complete search history.

(56) References Cited

U.S. PATENT DOCUMENTS

| | | | | |
|---|---|---|---|---|
| 7,555,587 | B2 * | 6/2009 | Bando .................. | H04N 1/2112 710/301 |
| 7,873,271 | B2 * | 1/2011 | Fujiwara ............... | G03B 15/03 348/371 |
| 2007/0165960 | A1 * | 7/2007 | Yamada ................. | H04N 9/735 382/254 |

(Continued)

FOREIGN PATENT DOCUMENTS

CN 201742472 U 2/2011

*Primary Examiner* — James Hannett
(74) *Attorney, Agent, or Firm* — Hauptman Ham, LLP

(57) ABSTRACT

An image sensor including an optoelectronic conversion circuit, a read circuit, a timing control and a serial interface is provided. The optoelectronic conversion circuit is configured to store a charge amount. The read circuit is coupled to the optoelectronic conversion circuit via a bit line. The timing control is configured to send at least one control signal to control the optoelectronic conversion circuit to store the charge amount and control the read circuit to read the charge amount stored in the optoelectronic conversion circuit. The serial interface is coupled to the timing control and configured to send a trigger signal to the timing control to activate the timing control to send the at least one control signal.

16 Claims, 11 Drawing Sheets

(56) References Cited

U.S. PATENT DOCUMENTS

| | | | | |
|---|---|---|---|---|
| 2010/0097371 A1* | 4/2010 | Willassen | ............... | H04N 5/378 345/214 |
| 2010/0302426 A1* | 12/2010 | Moini | .................... | H04N 5/378 348/308 |
| 2015/0163435 A1* | 6/2015 | Ota | ........................ | H04N 5/378 348/335 |
| 2015/0350465 A1* | 12/2015 | Creamer | ............ | H04N 1/00214 348/207.1 |

* cited by examiner

IMAGE SENSOR AND IMAGING SYSTEM ADOPTING ANALOG BUFFER

RELATED APPLICATIONS

The present application is a continuation-in-part application of U.S. Ser. No. 14/826,620, filed on Aug. 14, 2015, currently pending, the disclosure of which is hereby incorporated by reference herein in its entirety.

BACKGROUND

1. Field of the Disclosure

This disclosure generally relates to a sensing system and, more particularly, to an image sensor and an imaging system adopting analog buffers.

2. Description of the Related Art

A conventional image sensor generally has a plurality of sensing pixels arranged in array, wherein one operating method of the image sensor uses a rolling shutter, for example, to successively activate, with a control signal, each row of the sensing pixels in the image sensor to capture an image. Since each row of the sensing pixels is successively activated instead of simultaneously activated (i.e. start timings for each row of the sensing pixels to be exposed are different), the image captured by using the rolling shutter may cause distortion in capturing an image of a fast moving object.

Another operating method of the image sensor uses a global shutter, for example, simultaneously to activate all sensing pixels in the image sensor with a control signal so that each row of the sensing pixels starts to be exposed at an identical time to capture an image. Therefore, the image sensor using the global shutter may avoid the distortion problem.

However, in order to eliminate ambient light interference or reducing image noise when the image sensor using the global shutter is capturing an image, one solution is to directly perform a subtraction between two digital image frames through image post processing so as to obtain a differential image frame. For example, referring to FIGS. 1A and 1B, FIG. 1A is a timing diagram of a conventional image sensor 91 using the global shutter to capture an image. It is assumed that the image sensor 91 has 4 rows of sensing pixels $R_1$-$R_4$. In a first period $P_1$, a light source is turned on for a predetermined time and the rows of sensing pixels $R_1$-$R_4$ are simultaneously exposed. Then, the light source is turned off and the rows of sensing pixels $R_1$-$R_4$ are successively read to output a first image signal. In a second period $P_2$, the light source is turned off and the rows of sensing pixels $R_1$-$R_4$ are simultaneously exposed for the predetermined time, and the rows of sensing pixels $R_1$-$R_4$ are successively read to output a second image signal.

Then, referring to FIG. 1B, the first image signal outputted from the image sensor 91 is firstly converted into a first digital signal 9a through an analog to digital converter 93 and stored in a digital buffer 95. Then, the second image signal is converted into a second digital signal 9b through the analog to digital converter 93. Finally, the second digital signal 9b is subtracted from the first digital signal 9a to obtain a third digital signal 9c in which ambient light is eliminated. However, in this way, the digital buffer 95 has to be disposed in a system including the image sensor 91 and the image sensor 91 must successively output two image frames (e.g. image frames forming according to the first digital signal 9a and the second digital signal 9b) so that one processed image frame is obtainable (e.g. an image frame formed according to the third digital signal 9c).

Even though the subtraction between the digital signals mentioned above is not calculated, sensing data corresponding to all the sensing pixels are automatically read from the image sensor 91 to be stored in a digital buffer, which is generally a SRAM, after the exposure of the sensing pixels. And the stored sensing data is waited to be read by an external device.

SUMMARY

Accordingly, the present disclosure provides a method utilizing an analog differencing to eliminate noise from ambient light and an image sensor using the same.

The present disclosure provides an image sensor from which the noise due to ambient light in each analog image outputted has been already eliminated.

The present disclosure further provides an image sensor and an imaging system adopting analog buffers that store sensing data in the analog buffer of sensing pixels without employing a large digital buffer in a series interface for storing the whole digital image frame.

The present disclosure provides an image sensor including an optoelectronic conversion circuit, a read circuit, a timing control and a serial interface. The optoelectronic conversion circuit is configured to store a charge amount. The read circuit is coupled to the optoelectronic conversion circuit via a bit line. The timing control is configured to send at least one control signal to control the optoelectronic conversion circuit to store the charge amount and control the read circuit to read the charge amount stored in the optoelectronic conversion circuit. The serial interface is coupled to the timing control and configured to send a trigger signal to the timing control to activate the timing control to send the at least one control signal.

The present disclosure further provides an imaging system including a host, a serial interface, a sensor array, a read circuit and a timing control. The host is configured to send a read request. The serial interface is configured to send image data to the host and send a trigger signal when receiving the read request. The sensor array is configured to store a plurality of charge amounts. The read circuit is coupled to the sensor array via a plurality of bit lines. The timing control is configured to send, after receiving the trigger signal, a control signal to control the read circuit to read the charge amounts stored in the sensor array to the serial interface to be configured as the image data.

The present disclosure further provides an image sensor including a sensor array configured to sequentially output a first frame and a second frame. The sensor array includes an optoelectronic conversion circuit configured to store a first charge amount for a first storage time corresponding to the first frame and store a second charge amount for a second storage time corresponding to the second frame, wherein the first storage time is not equal to the second storage time.

BRIEF DESCRIPTION OF THE DRAWINGS

Other objects, advantages, and novel features of the present disclosure will become more apparent from the following detailed description when taken in conjunction with the accompanying drawings.

DETAILED DESCRIPTION OF THE EMBODIMENT

It should be noted that, wherever possible, the same reference numbers will be used throughout the drawings to refer to the same or like parts.

Figure 1A:
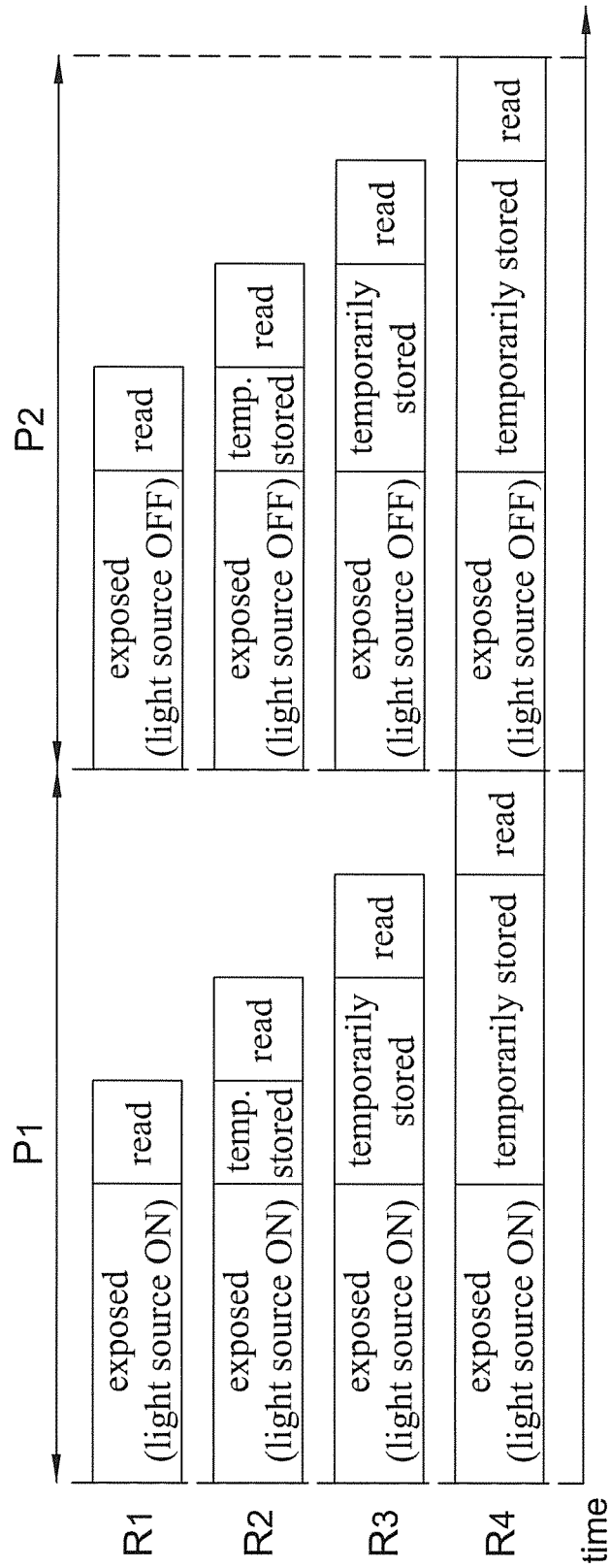
FIG. 1A is a timing diagram of a conventional image sensor using a global shutter to capture an image.
Figure 1B:
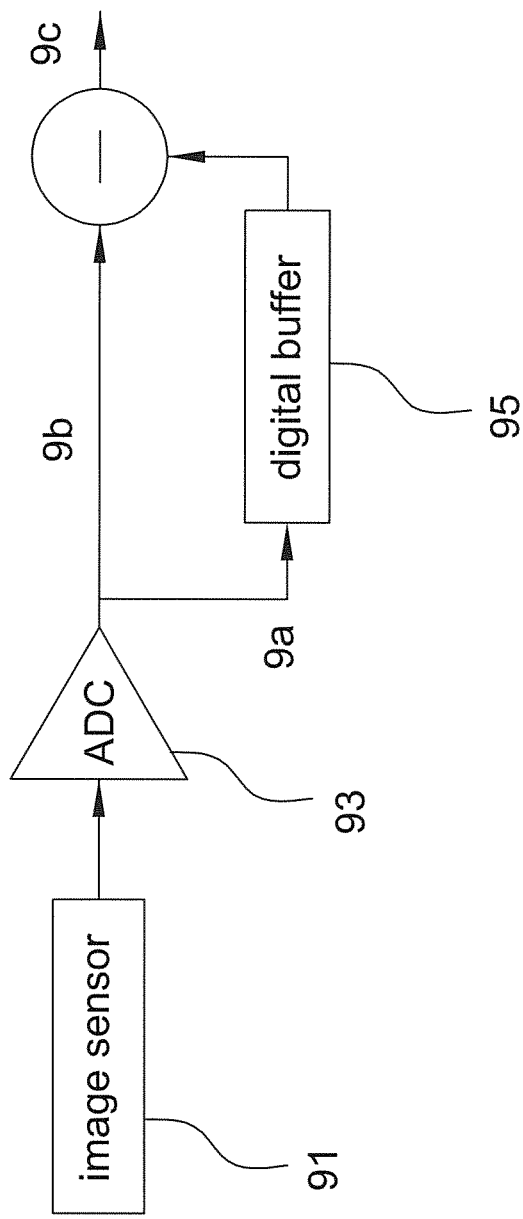
FIG. 1B is a block diagram of performing a conventional differential operation between two image frames in a digital end.
Figure 2:
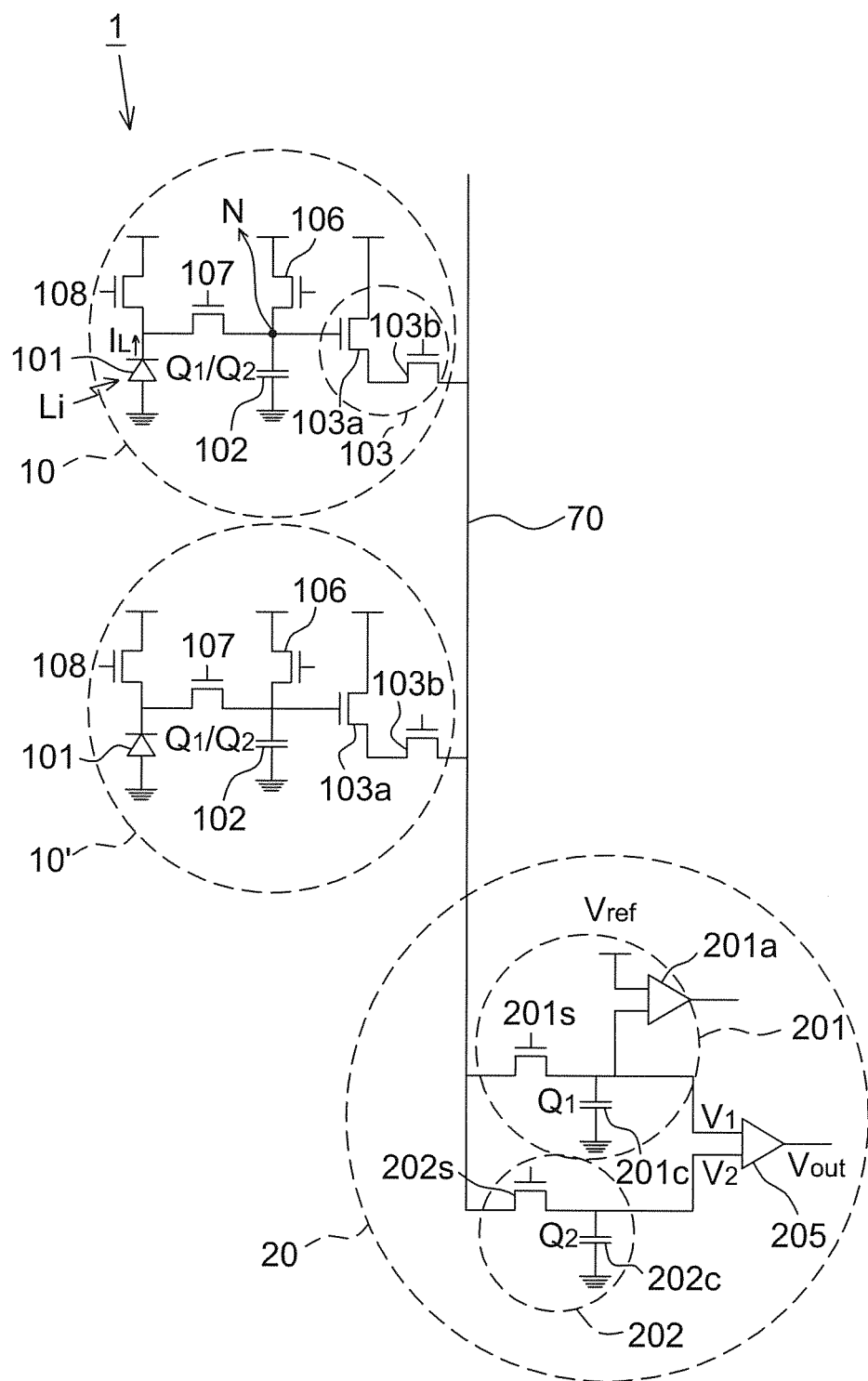
FIG. 2 is a circuit diagram of an image sensor according to some embodiments of the present disclosure.

FIG. 2 is a circuit diagram of an image sensor 1 according to some embodiments of the present disclosure. The image sensor 1 is configured to sense light energy and convert the light energy into an electrical signal. The image sensor 1 includes at least one optoelectronic conversion circuit 10 and an output circuit 20, wherein a bit line 70 is connected between an output terminal of the optoelectronic conversion circuit 10 and an input terminal of the output circuit 20. An image sensor may have a plurality of optoelectronic conversion circuits arranged in array to be served as sensing pixels, and an output terminal of each column of the optoelectronic conversion circuits may be electrically connected to an input terminal of an output circuit through a bit line. For example, an image sensor including M×N pixels generally has M×N optoelectronic conversion circuits and M or N output circuits and bit lines. For simplification, FIG. 2 exemplarily shows only two optoelectronic conversion circuits 10 and 10', one output circuit 20 and one bit line 70 of the image sensor 1. It is appreciated that though the optoelectronic conversion circuits 10 and 10' have different reference numerals, both optoelectronic conversion circuits have an identical structure and are configured to show two sensing pixels in one column of the image sensor 1 (e.g. a sensing pixel at a first row of a first column and a sensing pixel at a second row of the first column).

It should be mentioned that the image sensor 1 may work together with at least one light source (not shown), which is configured to provide required light, when the image sensor 1 captures an image, and thus the light source is considered as a fill light (e.g. an LED). The image sensor 1 includes a signal generator or a timing controller (not shown) configured to successively send a high level signal and a low level signal to turn on and turn off the light source, but not limited thereto. In other embodiments, the high level signal and the low level signal are provided by an imaging system including the image sensor 1. For example, the high level signal and the low level signal are provided by a control circuit of the imaging system and provided to the image sensor 1. In some embodiments, the light source and the image sensor are included in a same image sensor package, and operations of the light source and the image sensor are both controlled by a timing controller. In some embodiments, the light source is located outside of the image sensor, and the image sensor generates the high level signal and the low level signal to control the light source. It should be mentioned that though a high level signal and a low level signal are respectively used for description herein, the signal generator, timing controller or control circuit mentioned above may only generate the high level signal, and the low level signal is referred to no signal being generated, e.g. the signal value is equal to 0.

The optoelectronic conversion circuit 10 is configured to store a first charge $Q_1$ corresponding to a period of a high level signal and store a second charge $Q_2$ corresponding to a period of a low level signal, wherein the high level signal is configured to turn on the light source and the low level signal is configured to turn off the light source. That is to say, the light source is turned on at the same time when the optoelectronic conversion circuit 10 stores the first charge $Q_1$, and the light source is turned off at the same time when the optoelectronic conversion circuit 10 stores the second charge $Q_2$.

The optoelectronic conversion circuit 10 includes an optoelectronic element 101, a pixel capacitor 102 and a transfer circuit 103. The optoelectronic element 101 is, for example, a photodiode configured to convert incident light $L_i$ into a photocurrent $I_L$, wherein the photocurrent $I_L$ is associated with intensity of the incident light $L_i$. The pixel capacity 102 is then configured to store the photocurrent $I_L$ as the first charge $Q_1$ or the second charge $Q_2$. It is appreciated that when the light source is turned on, the incident light $L_i$ includes light emitted from the light source and ambient light, and the optoelectronic element 101 converts the light emitted from the light source and the ambient light into the photocurrent $I_L$ and a charge (i.e. the first charge $Q_1$) is stored in the pixel capacitor 102 accordingly. When the light source is turned off, the incident light $L_i$ includes only the ambient light, and then the optoelectronic element 101 converts the ambient light into the photocurrent $I_L$ and another charge (i.e. the second charge $Q_2$) is stored in the pixel capacitor 102 accordingly. It should be mentioned that the transfer circuit 103 is coupled between the pixel capacitor 102 and the output circuit 20. Before the pixel capacitor 102 stores the second charge $Q_2$, the transfer circuit 103 firstly transfers the first charge $Q_1$ from the pixel capacitor 102 to the output circuit 20, and the second charge Q2 is then stored in the pixel capacitor 102.

In some embodiments, the transfer circuit 103 includes switching elements configured to control the charge transferring according to the opening and closing of the switching elements, e.g. a first gate 103a and a second gate 103b being shown in FIG. 2. When the first charge $Q_1$ or the second charge $Q_2$ is stored in the pixel capacitor 102, a node N in FIG. 2 has an electric potential (V=Q/C) corresponding to the first charge $Q_1$ or the second charge $Q_2$. To transfer the charges to the output circuit 20, the first gate 103a of the transfer circuit 103 is, for example, a source follower transistor and coupled to the node N to output the charges to the output circuit 20. On the other hand, since the optoelectronic conversion circuits 10 and 10' are both coupled to an identical output circuit (i.e. the output circuit 20), the second gate 103b of the optoelectronic conversion circuit 10 and that of the optoelectronic conversion circuit 10' may not be switched on simultaneously so that the output circuit 20 may successively receive the charges from the optoelectronic conversion circuit 10 and the optoelectronic conversion circuit 10'.

In addition, in some embodiments, the optoelectronic conversion circuit 10 further includes a third gate 106, a fourth gate 107 and a fifth gate 108. The third gate 106 is coupled to the node N and configured to charge or discharge the pixel capacitor 102 to a predetermined electric quantity, and thus the third gate 106 is considered as a reset transistor. The fourth gate 107 is coupled between the optoelectronic element 101 and the pixel capacitor 102 and configured to control the photocurrent converted by the optoelectronic element 101 to be outputted to the pixel capacitor 102 so as to temporarily store the first charge $Q_1$ or the second charge $Q_2$ in the pixel capacitor 102. The fifth gate 108 is coupled to an output terminal of the optoelectronic element 101 and configured to remove accumulated charges in the optoelectronic element 101 during an unexposed period (i.e. a period when the shutter is closed).

Referring to FIG. 2 continuously, the output circuit 20 includes a first storage circuit 201 and a second storage circuit 202 respectively configured to store the first charge $Q_1$ and the second charge $Q_2$ transferred from the optoelectronic conversion circuit 10 (or the optoelectronic conversion circuit 10'). In some embodiments, the first storage circuit 201 and the second storage circuit 202 respectively include a switching element and a storage capacitor. For example, the first storage circuit 201 includes a switching element 201s and a storage capacitor 201c, and the second storage circuit 202 includes a switching element 202s and a storage capacitor 202c as shown in FIG. 2. When the second gate 103b of the transfer circuit 103 is switched on, the switching element 201s or 202s is also switched on so as to transfer the first charge $Q_1$ from the pixel capacitor 102 to the storage capacitor 201c of the first storage circuit 201 or transfer the second charge $Q_2$ from the pixel capacitor 102 to the storage capacitor 202c of the second storage circuit 202. That is to say, the switching elements 201s and 202s are configured to control the first charge $Q_1$ and the second charge $Q_2$ in the optoelectronic conversion circuit 10 to be transferred to the storage capacitors 201c and 202c for storage.

Therefore, after the transfer circuit 103 of the optoelectronic conversion circuit 10 transfers the first charge $Q_1$ from the pixel capacitor 102 to the first storage circuit 201 corresponding to the period of the low level signal, the optoelectronic conversion circuit 10 stores the second charge $Q_2$ in the pixel capacitor 102. Then, the transfer circuit 103 transfers the second charge $Q_2$ to the second storage circuit 202, as shown in FIG. 2.

The output circuit 20 further includes a differential unit 205 configured to compare the first charge $Q_1$ in the first storage circuit 201 with the second charge $Q_2$ in the second storage circuit 202 to output an analog image signal, wherein the first storage circuit 201 and the second storage circuit 202 are respectively coupled to two input terminals of the differential unit 205. The differential unit 205 is, for example, a differential amplifier. Accordingly, the output circuit 20 uses the differential unit 205 to perform an analog differencing between the first charge $Q_1$ in the first storage circuit 201 and the second charge $Q_2$ in the second storage circuit 202 to output the analog image signal. More specifically speaking, the first charge $Q_1$ stored in the storage capacitor 201c and the second charge $Q_2$ stored in the storage capacitor 202c respectively form two input voltages, e.g. a first voltage $V_1$ corresponding to the first charge $Q_1$ and a second voltage $V_2$ corresponding to the second charge $Q_2$, at the two input terminals of the differential unit 205. Then, an output voltage $V_{out}$ of the differential unit 205 may be obtained by a conventional formula of the differential amplifier, e.g. $V_{out}=A_d \times (V_1-V_2)+A_c \times (V_1+V_2)/2$, wherein $A_d$ is referred to a differential-mode gain and $A_c$ is referred to a common-mode gain.

It is appreciated that an output terminal of the output circuit 20 may be coupled to an analog to digital converter (not shown) so as to convert the analog image signal to a digital image signal for a digital signal processor to perform digital image processing, but the present disclosure is not limited thereto. In other embodiments, the output terminal of the output circuit 20 is coupled to a logic circuit (e.g. configured to perform the image brightness adjustment, image rotation/cut, red-eye removal and the like) or a memory unit (e.g. configured to be stored as an image data), and where the output terminal of the output circuit 20 is coupled to is determined according to actual applications.

Since the first charge $Q_1$ is stored corresponding to the period of the high level signal (the light source being turned on and thus the incident light $L_i$ containing the light emitted from the light source and the ambient light) and the second charge $Q_2$ is stored corresponding to the period of the low level signal (the light source being turned off and thus the incident light $L_i$ only containing the ambient light), noise due to the ambient light in the analog image signal output from the image sensor has been removed (also been removed in the digital image signal) after the differential unit 205 of the output circuit 20 compares the first charge $Q_1$ with the second charge $Q_2$. Therefore, after the analog image signal is converted into the digital image signal, the digital image signal is directly processed at a digital end (e.g. including the digital signal processor) and a digital image frame is generated accordingly. The differencing between two digital image frames is not necessary anymore.

In addition, an auto exposure is to adjust an exposure time corresponding to intensity of incident light. For example, when intensity of the incident light $L_i$ is too high, the image sensor 1 may reduce the exposure time (or adjust an aperture size, calibrate white balance, etc.) so as to avoid over exposure on the outputted image. In some embodiments, to implement the auto exposure, the first storage circuit 201 of the image sensor 1 further includes a comparator 201a configured to compare a voltage (i.e. the first voltage $V_1$) of the storage capacitor 201c with a reference voltage $V_{ref}$ to determine whether the auto exposure is performed, as shown in FIG. 2. For example, when the reference voltage $V_{ref}$ is larger than the first voltage $V_1$, the comparator 201a outputs a digital value 0 and the imaging system including the image sensor 1 does not adjust the exposure time of the image sensor 1. When the reference voltage $V_{ref}$ is equal to or smaller than the first voltage $V_1$, the comparator 201a outputs a digital value 1 so that the imaging system may reduce the exposure time of the image sensor 1.

Figure 3:
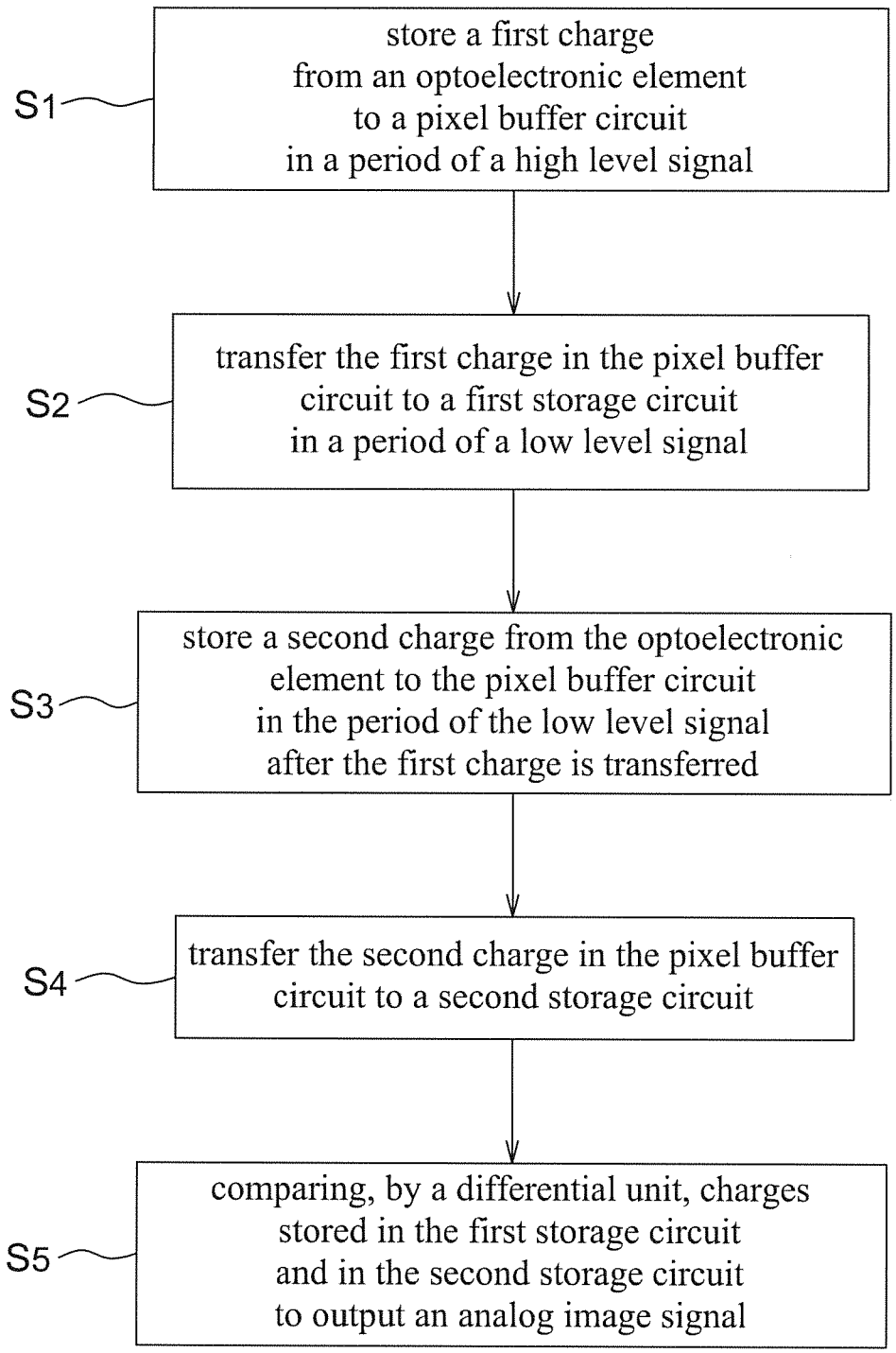
FIG. 3 is a flow chart of an operating method of an image sensor according to some embodiments of the present disclosure.

FIG. 3 is a flow chart of an operating method of an image sensor according to some embodiments of the present disclosure. The image sensor includes an optoelectronic element, a pixel buffer circuit, a first storage circuit, a second storage circuit and a differential unit. The first storage circuit and the second storage circuit are respectively coupled to two input terminals of the differential unit. The optoelectronic element is configured to generate photocurrents to be stored in the pixel buffer circuit corresponding to a high level signal and a low level signal, wherein the high level signal and the low level signal are configured to turn on and turn off a light source. The operating method includes the steps of: storing a first charge from the optoelectronic element to the pixel buffer circuit in a period of the high level signal (Step $S_1$); transferring the first charge in the pixel buffer circuit to the first storage circuit in a period of the low level signal (Step $S_2$); storing a second charge from the optoelectronic element to the pixel buffer circuit in the period of the low level signal after the first charge is transferred (Step $S_3$); transferring the second charge in the pixel buffer circuit to the second storage circuit (Step $S_4$); and comparing, by the differential unit, charges stored in the first storage circuit and in the second storage circuit to output an analog image signal (Step $S_5$).

Figure 4:
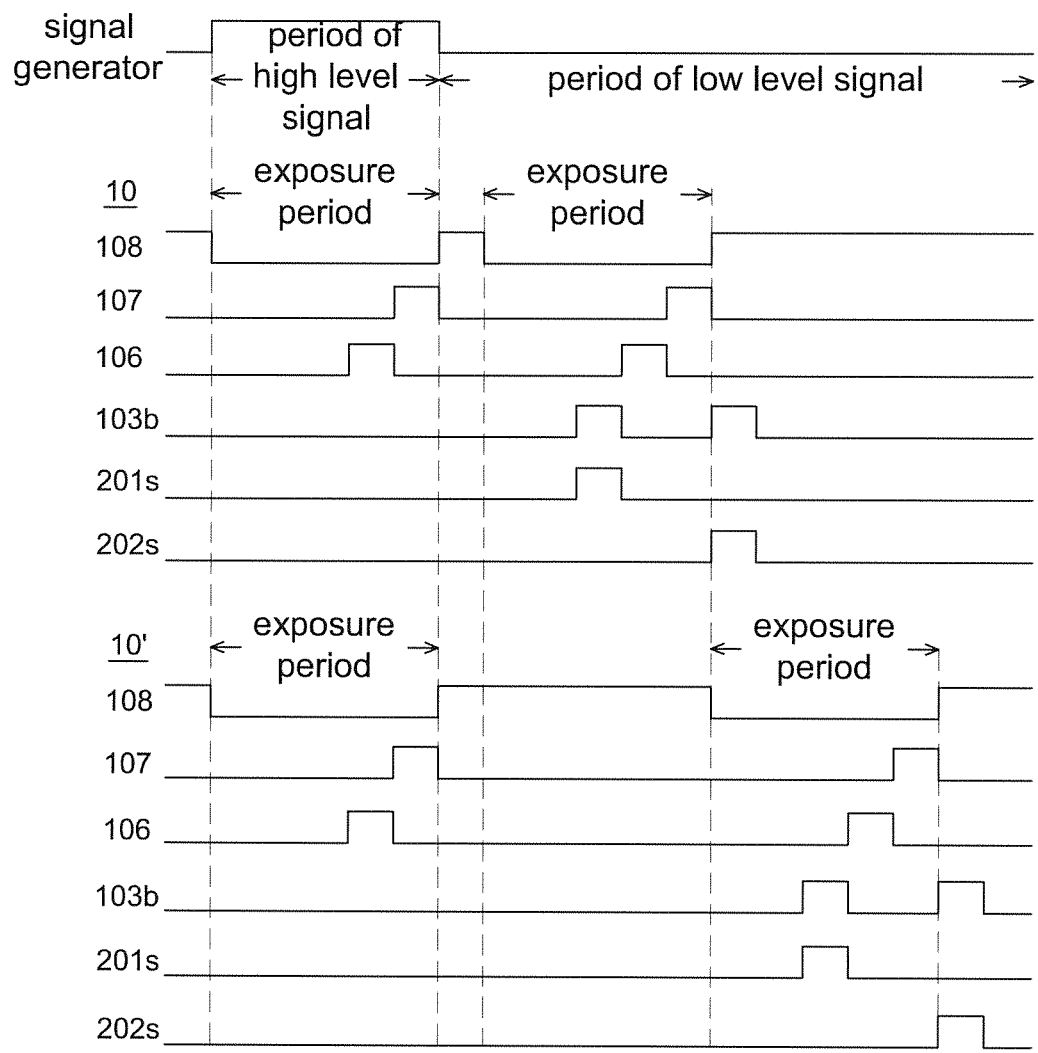
FIG. 4 is a timing diagram of a plurality of switching elements corresponding to FIGS. 2 and 3.

In one embodiment, the operating method of the image sensor in FIG. 3 is corresponding to the image sensor 1 in FIG. 2, wherein the optoelectronic element is the optoelectronic element 101 of the optoelectronic conversion circuit 10 (or the optoelectronic conversion circuit 10'), and the pixel buffer circuit includes the pixel capacitor 102 and the transfer circuit 103. Referring to FIGS. 2-4 together, FIG. 4 is a timing diagram corresponding to a plurality of switching elements in FIGS. 2 and 3, and then the operating method of the image sensor is described hereinafter.

Step $S_1$: Firstly, in the period of the high level signal (e.g. using a drive circuit to turn on a light source), the fifth gate 108 is switched off for a predetermined time so that a photocurrent generated by the optoelectronic element 101 does not pass through the fifth gate 108 to be released, and thus the period during the fifth gate 108 is switched off (i.e. the predetermined time) may be defined as an effective exposure time of the optoelectronic element 101. Then, the third gate 106 is switched on to charge or discharge the pixel capacitor 102 to a predetermined electric quantity. When the pixel capacitor 102 has the predetermined electric quantity, the third gate 106 is switched off and the fourth gate 107 is switched on. The optoelectronic element 101 may store the first charge $Q_1$ to the pixel buffer circuit (e.g. the pixel capacitor 102) in the period of the high level signal.

Similarly, the optoelectronic element 101 of the optoelectronic conversion circuit 10' also stores the first charge $Q_1$ to the pixel capacitor 102 of the optoelectronic conversion circuit 10' in the period of the high level signal. It should be mentioned that the first charge $Q_1$ stored in the optoelectronic conversion circuit 10 and the first charge $Q_1$ stored in the optoelectronic conversion circuit 10' are only intended to indicate charges stored corresponding to the period of the high level signal. Since the optoelectronic conversion circuits 10 and 10' are disposed at different positions of the image sensor 1, light energy received by the optoelectronic conversion circuit 10 and the optoelectronic conversion circuit 10' are not necessary to be identical, and thus the first charge $Q_1$ of the optoelectronic conversion circuit 10 and the first charge $Q_1$ of the optoelectronic conversion circuit 10' are not necessary to be identical.

It should be mentioned that the optoelectronic element 101 converts the incident light into the photocurrent all the time, and thus the off-time of the fifth gate 108 (i.e. the predetermined time) may be considered as the exposure time of the image sensor 1, but the present disclosure is not limited thereto. In other embodiments, the imaging system including the image sensor 1 sends a shutter signal to control the optoelectronic element 101 to start to generate or stop generating the photocurrent, and in this case the fifth gate 108 may not be implemented in the image sensor 1.

Step $S_2$: Then, in the period of the low level signal (e.g. using the drive circuit to turn off the light source or not to turn on the light source), the fifth gate 108 of the optoelectronic conversion circuit 10 is switched off so that a photocurrent generated by the optoelectronic element 101 does not pass through the fifth gate 108 to be released. The difference between the period of the low level signal and the period of the high level signal is that before the third gate 106 is switched on so as to reset the pixel capacitor 102 in the period of the low level signal, the second gate 103b and the first switch 201s of the first storage circuit 201 are switched on at the same time so as to transfer the first charge $Q_1$ of the pixel capacitor 102 to the storage capacitor 201c of the first storage circuit 201.

As mentioned above, in some embodiments, after the first charge $Q_1$ is transferred (i.e. after Step $S_2$), the comparator 201a included in the first storage circuit 201 compares the voltage of the storage capacitor with the reference voltage $V_{ref}$ to determine whether the auto exposure is performed.

Step $S_3$: After the first charge $Q_1$ is transferred from the pixel capacitor 102 to the first storage circuit 201, the second gate 103b and the first switch 201s are switched off and the third gate 106 is switched on to charge or discharge the pixel capacitor 102 to the predetermined electric quantity. When the pixel capacitor 102 has the predetermined electric quantity, the third gate 106 is switched off and the fourth gate 107 is switched on, and then the optoelectronic element 101 may store the second charge $Q_2$ to the pixel buffer circuit (e.g. the pixel capacitor 102).

Step $S_4$: After the second charge $Q_2$ is stored to the pixel capacitor 102, the second gate 103b and the second switch 202s is switched on at the same time to transfer the second charge $Q_2$ in the pixel capacitor 102 in the optoelectronic conversion circuit 10 to the second storage circuit 202. It is appreciated that the image sensor 1 transfers the first charge $Q_1$ from the pixel buffer circuit to the first storage circuit 201 and transfers the second charge $Q_2$ from the pixel buffer circuit to the second storage circuit 202 through the transfer circuit 103. Meanwhile, the storage capacitor 201c of the first storage circuit 201 and the storage capacitor 202c of the second storage circuit 202 respectively store the first charge $Q_1$ and the second charge $Q_2$, and form the first voltage $V_1$ and the second voltage $V_2$ at the two input terminals of the differential unit 205.

Step $S_5$: Finally, the differential unit 205 compares the first voltage $V_1$ of the first storage circuit 201 with the second voltage $V_2$ of the second storage circuit 202 to output an analog image signal. Accordingly, noise due to ambient light is eliminated before the analog image signal is converted into a digital image signal through an analog to digital converter.

In some embodiments, a time interval between the first storage circuit 201 storing the first charge $Q_1$ and the second storage circuit 202 storing the second charge $Q_2$ is preferably arranged to be short to prevent the first charge $Q_1$ stored in the storage capacitor 201c from attenuation before the storage capacitor 202s stores the second charge $Q_2$. Accordingly, the differential unit 205 may accurately output the analog image signal according to the first voltage $V_1$ and the second voltage $V_2$. For example, the time interval is smaller than or equal to the off-time of the fifth gate 108 (i.e. the predetermined time or the period of the high level signal).

It should be mentioned that since the optoelectronic conversion circuits 10 and 10' are coupled to an identical output circuit (i.e. the output circuit 20), the optoelectronic conversion circuit 10' is unable to transfer the first charge $Q_1$ or the second charge $Q_2$ therein to the output circuit 20 when the optoelectronic conversion circuit 10 transfers the first charge $Q_1$ or the second charge $Q_2$ therein to the output circuit 20. Therefore, the image sensor 1 successively switches on the second gate 103b and the first switch 201s of the optoelectronic conversion circuit 10, the second gate 103b and the second switch 202s of the optoelectronic conversion circuit 10, the second gate 103b and the first switch 201s of the optoelectronic conversion circuit 10', and the second gate 103b and the second switch 202s of the optoelectronic conversion circuit 10' so that the first charge $Q_1$ and the second charge $Q_2$ in the optoelectronic conversion circuit 10 and the first charge $Q_1$ and the second charge $Q_2$ in the optoelectronic conversion circuit 10' may be transferred sequentially, as shown in FIG. 4.

It is appreciated that the first charge $Q_1$ stored in the optoelectronic conversion circuit 10' corresponding to the period of the high level signal (i.e. a period when the fifth gate 108 is switched off at a first time) is transferred to the output circuit 20 in a period when the fifth gate 108 is switched off at a second time. Therefore, the second gate 103b of the optoelectronic conversion circuit 10' remains switched-off state before the optoelectronic conversion circuit 10 transfers the second charge $Q_2$ to the output circuit 20. In some embodiments, a control signal (e.g. sent from the image sensor 1 or the imaging system) controls the fifth gates 108 of the optoelectronic conversion circuits 10 and 10' to be switched off at the same time in the period of the high level signal. Then, in the period of the low level signal, the control signal successively switches off the fifth gate 108 of the optoelectronic conversion circuits 10 and the fifth gate 108 of the optoelectronic conversion circuits 10'. As mentioned above, the period during which the fifth gate 108 is switched off may be defined as an effective exposure time of the optoelectronic element 101. That is to say, the optoelectronic conversion circuits 10 and 10' of the image sensor 1 are simultaneously exposed in the period of the high level signal, and then the optoelectronic conversion circuits 10 and 10' are successively exposed in the period of the low level signal.

Figure 5:
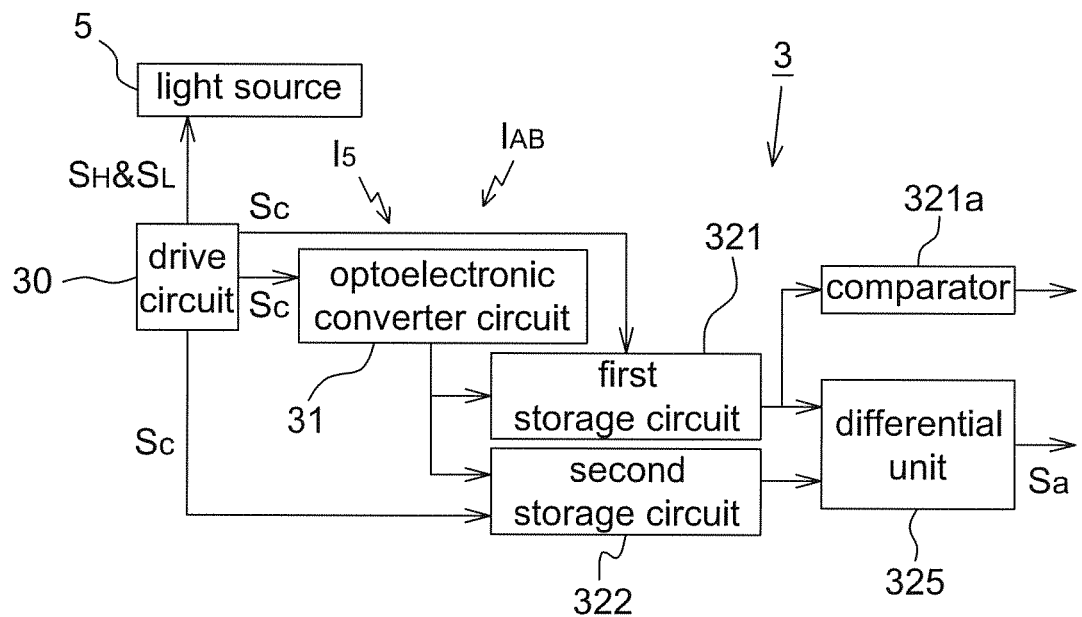
FIG. 5 is a block diagram of an image sensor according to some embodiments of the present disclosure.

FIG. 5 is a block diagram of an image sensor 3 according to some embodiments of the present disclosure. The image sensor 3 includes a drive circuit 30, an optoelectronic conversion circuit 31, a first storage circuit 321, a second storage circuit 322 and a differential unit 325, wherein the drive circuit 30 is electrically connected with the optoelectronic conversion circuit 31, an input terminal of the first storage circuit 321 and an input terminal of the second storage circuit 322 are both coupled to an output terminal of the optoelectronic conversion circuit 31, and the differential unit 325 includes two input terminals respectively coupled to the first storage circuit 321 and the second storage circuit 322.

The drive circuit 30 is, for example, a signal generator or a timing controller configured to successively generates a high level signal $S_H$ and a low level signal $S_L$, wherein the high level signal $S_H$ and the low level signal $S_L$ are respectively configured to turn on a light source 5 in a first period and turn off the light source 5 in a second period. Besides, the drive circuit 30 also generates at least one control signal $S_c$ to control the opening and closing of a plurality of switching elements in the optoelectronic conversion circuit 31, the first storage circuit 321 and the second storage circuit 322, e.g. to control the second gate 103b, the third gate 106, the fourth gate 107, the fifth gate 108, the first switch 201s and the second switch 202s in FIGS. 2 and 4 to be switched on and off. In other embodiments, an imaging system including the image sensor 3 further provides a control circuit to turn on and turn off the light source 5, and the control signal of the light source 5 is transmitted to the drive circuit 30 of the image sensor 3 to allow the drive circuit 30 to correspondingly control the plurality of switching elements.

When the light source 5 is turned on in the first period, the optoelectronic conversion circuit 31 receives light source intensity $I_S$ and ambient light intensity $I_{AB}$ together. When the light source 5 is turned off in the second period, the optoelectronic conversion circuit 31 only receives the ambient light intensity $I_{AB}$. Accordingly, the optoelectronic conversion circuit 31 generates a photocurrent corresponding to the light source 5 and ambient light in the first period and generates a photocurrent corresponding to the ambient light in the second period. It should be mentioned that said light source intensity $I_S$ is caused by reflected light from the object to be detected, i.e. the light source 5 in the present disclosure being configured to illuminate an object to be detected.

Then, in the second period the first storage circuit 321 stores a first charge corresponding to the photocurrent of the first period. The second storage circuit 322 stores a second charge corresponding to the photocurrent of the second period after the first charge is stored. It is appreciated that the first charge is associated with the light source intensity $I_S$ and the ambient light intensity $I_{AB}$, whereas the second charge is associated with the ambient light intensity $I_{AB}$ only.

Finally, the differential unit 325 compares charges stored in the first storage circuit 321 and in the second storage circuit 322 (e.g. the first charge $Q_1$ and the second charge $Q_2$ in FIG. 2) to eliminate noise due to the ambient light and output an analog image signal $S_a$. In some embodiments, the differential unit 325 directly performs an analog differencing between charges store in the first storage circuit 321 and in the second storage circuit 322 and outputs the analog image signal $S_a$.

Similarly, in some embodiments, to implement an auto exposure, the first storage circuit 321 further includes a comparator 321a configured to compare a voltage of a storage capacitor in the first storage circuit 321 with a reference voltage to determine whether the auto exposure is performed. It should be mentioned that though the comparator 321a is shown to be coupled between the first storage circuit 321 and the differential unit 325 in FIG. 5, the coupling position thereof does not have particular limitations as long as the comparator 321a is coupled to the voltage of the storage capacitor in the first storage circuit 321.

Figure 6:
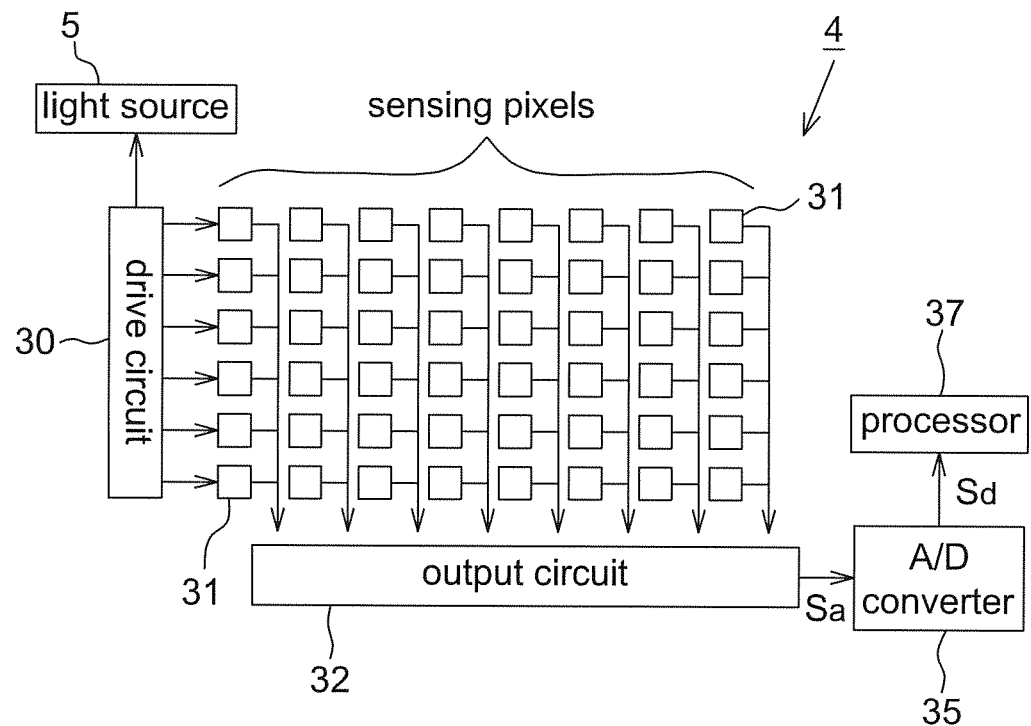
FIG. 6 is a schematic diagram of an imaging system including a plurality of sensing pixels according to some embodiments of the present disclosure.
Figure 7:
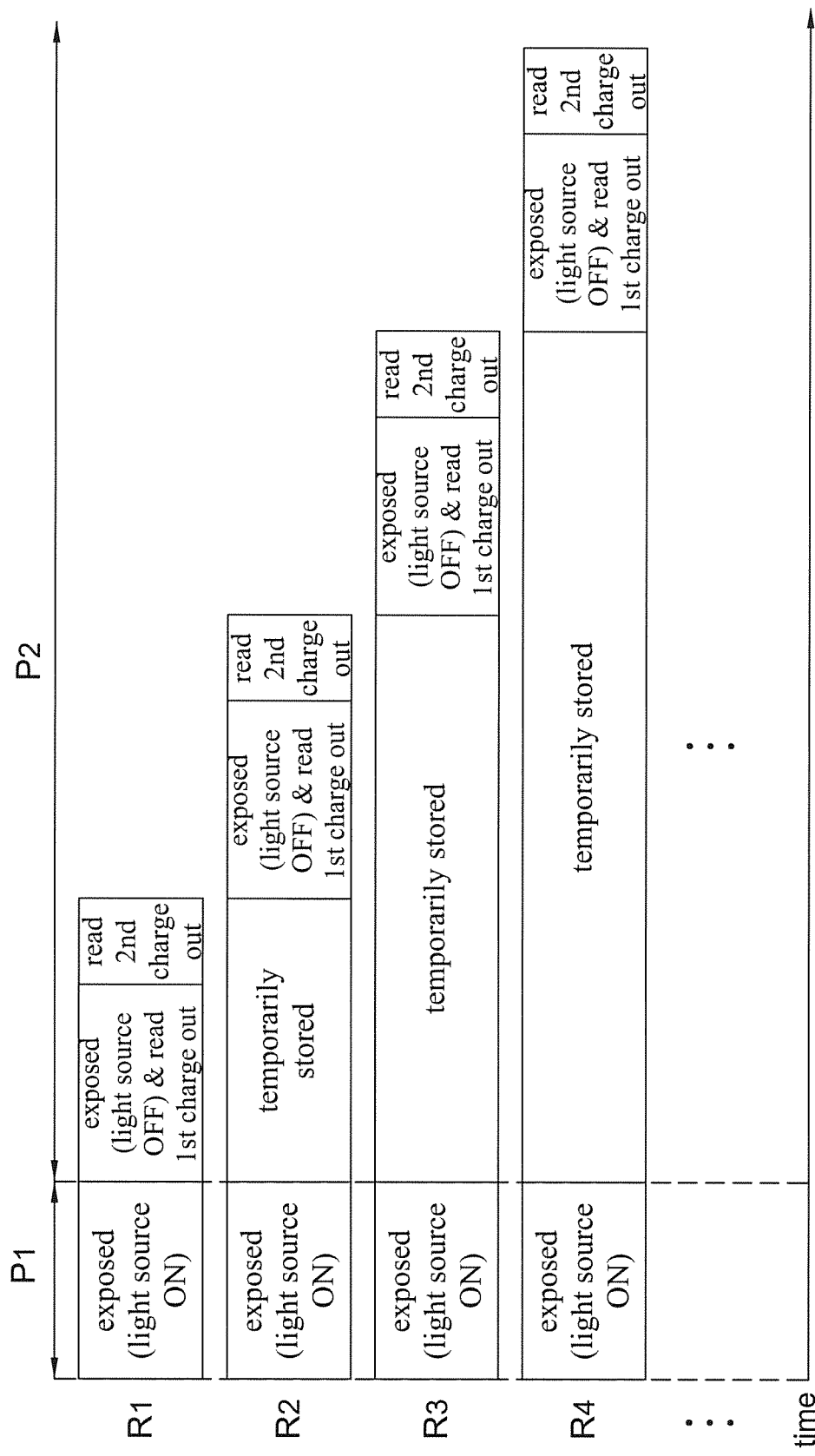
FIG. 7 is a timing diagram corresponding to FIG. 6.

As mentioned above, the image sensor according to some embodiments of the present disclosure has a plurality of optoelectronic conversion circuits arranged in array to be served as sensing pixels. Referring to FIGS. 6 and 7, FIG. 6 is a schematic diagram of an imaging system 4 including a plurality of optoelectronic conversion circuits according to some embodiments of the present disclosure, and FIG. 7 is a timing diagram corresponding to FIG. 6. The imaging system 4 includes a light source 5, a drive circuit 30 (or a control circuit), a plurality of optoelectronic conversion circuits 31 arranged in 6×8 array, an output circuit 32, an analog to digital converter 35 and a processor 37, wherein a first row of the optoelectronic conversion circuits 31 may be defined as a row of sensing pixels $R_1$, a second row of the optoelectronic conversion circuits 31 may be defined as a row of sensing pixels $R_2$, and so on.

When the drive circuit 30 turns on the light source 5 in a first period $P_1$, the drive circuit 30 simultaneously controls all of the optoelectronic conversion circuits 31 to be exposed such that a plurality of first charges are stored.

When the drive circuit 30 turns off the light source 5 in a second period $P_2$, the drive circuit 30 firstly controls the first row of the optoelectronic conversion circuits 31 (i.e. the row of sensing pixels $R_1$) to transfer the first charges therein to the output circuit 32, controls the row of sensing pixels $R_1$ to be exposed again to store a plurality of second charges and transfers the plurality of second charges to the output circuit 32 so that the output circuit 32 may compare each first charge with corresponded each second charge to output an analog image signal $S_a$ corresponding to the first row. Then, the drive circuit 30 successively controls the second to sixth rows of the optoelectronic conversion circuits 31 to output the analog image signals $S_a$ corresponding to the second to sixth rows, as shown in FIG. 7.

In some embodiments, an amplifier is disposed at an input terminal of the analog to digital converter in the imaging system 4 and configured to amplify the analog image signals $S_a$. Finally, after the analog image signals $S_a$ pass through the analog to digital converter 35, the processor 37 may output an image according to the digital image signal $S_d$ corresponding to the plurality of sensing pixels (i.e. the optoelectronic conversion circuits 31). It is appreciated that noise due to ambient light in the image outputted from the imaging system 4 is eliminated, and the image processing upon the image may be directly performed.

In some embodiments, the first storage circuit and the second storage circuit respectively include a switching element and a storage capacitor. The switching element is configured to control the first charge and the second charge in the optoelectronic conversion circuit to be transferred to the storage capacitor.

In some embodiments, the first storage circuit further includes a comparator configured to compare a voltage of the storage capacitor with a reference voltage to determine whether an auto exposure is performed.

In some embodiments, the image sensor further includes a drive circuit to successively generate the high level signal and the low level signal.

The image sensor according to the embodiment of the present disclosure may directly compare, by timing control, a first charge associated with a light source and ambient light with a second charge only associated with the ambient light, but not perform a differential operation between digital image frames respectively formed from the first charge and the second charge. Accordingly, noise due to the ambient light is eliminated without increasing the power consumption.

Figure 8:
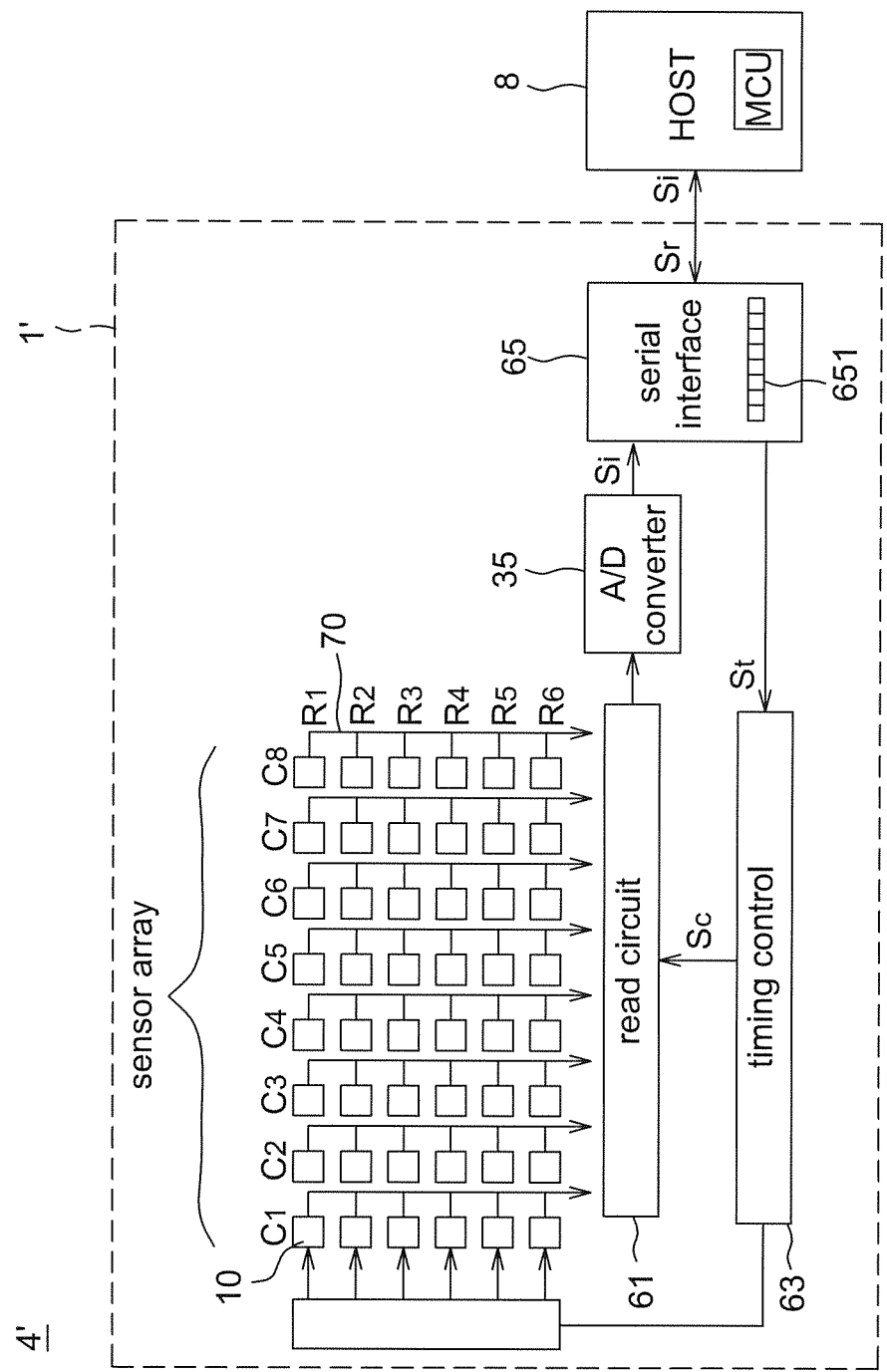
FIG. 8 is a schematic block diagram of an imaging system according to some embodiments of the present disclosure.

Referring to FIG. 8, it is a schematic block diagram of an imaging system 4' according to some embodiments of the present disclosure. The imaging system 4' includes an image sensor 1' and a host 8, wherein the host 8 performs various applications according to image data Si captured by the image sensor 1', e.g., the proximity sensing and gesture control. In some embodiments, the host 8 is, for example, a portable electronic device or a wearable device, and the image sensor 1' is disposed inside the host 8. In some embodiments, the host 8 is separated from the image sensor 1' and coupled thereto via a wireless or wired manner. When the host 8 is ready to receive the image data Si, a read request Sr is sent, e.g., from a microcontroller or a CPU therein, to the image sensor 1' to inform the image sensor 1' to start to send the image data Si.

The image sensor 1' includes a sensor array, a read circuit 61, a timing control 63, a serial interface 65 and an analog to digital converter (ADC) 35, wherein the serial interface 65 is configured as a communication interface between the image sensor 1' and the host 8, and configured to perform the communication via a wired or wireless manner.

The sensor array includes a plurality of sensing pixels arranged in matrix, e.g., 6×8 sensing pixels being shown in FIG. 8. Each sensing pixel is used to store a charge amount corresponding to an image frame. As mentioned above, the sensing pixel is an optoelectronic conversion circuit 10 shown in FIG. 2.

Figure 9:
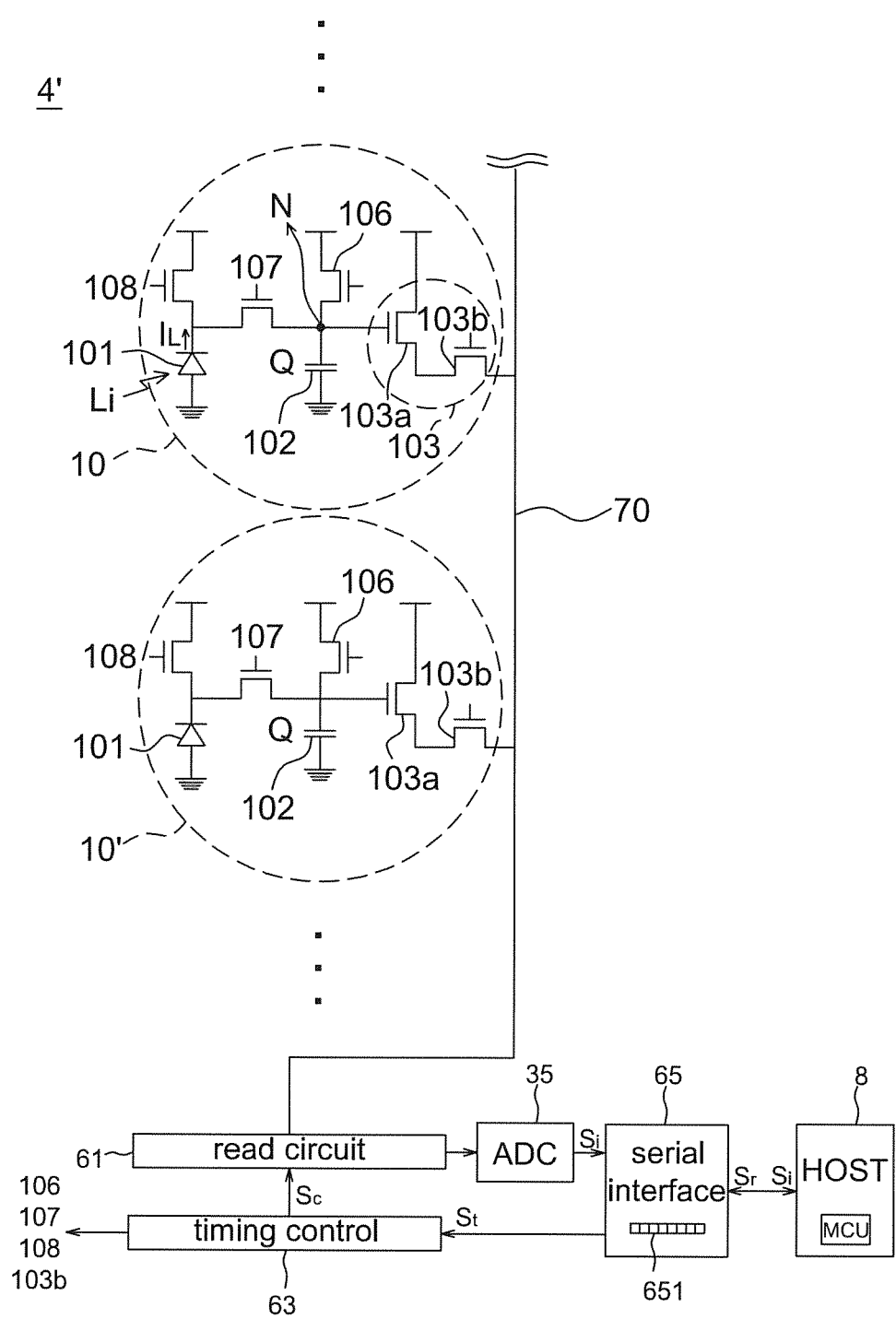
FIG. 9 is another schematic block diagram of an imaging system according to some embodiments of the present disclosure.

Referring to FIG. 9, it is another schematic block diagram of an imaging system 4' according to some embodiments of the present disclosure, which shows the circuit structure of each sensing pixel. Similar to the descriptions associated with FIG. 2, FIG. 9 shows only two optoelectronic conversion circuits 10 and 10' of one sensing pixel column. Details of the elements included in the optoelectronic conversion circuits 10 and 10' shown in FIG. 9 can be referred to the descriptions corresponding to FIG. 2. Each sensing pixel (or optoelectronic conversion circuit) includes an optoelectronic element 101 configured to convert incident light Li to photocurrent $I_L$ and a pixel capacitor 102 configured to store the photocurrent $I_L$ as a charge amount Q. More specifically, in this embodiment each sensing pixel includes the pixel capacitor 102 configured as an analog buffer, which is used to store a charge amount Q corresponding to every image frame. A storage time of the charge amount Q being stored in the analog buffer is determined according to when the host 8 sends the read request Sr, and thus it is possible that the storage times corresponding to different sensing pixels are different from one another.

Figure 10:
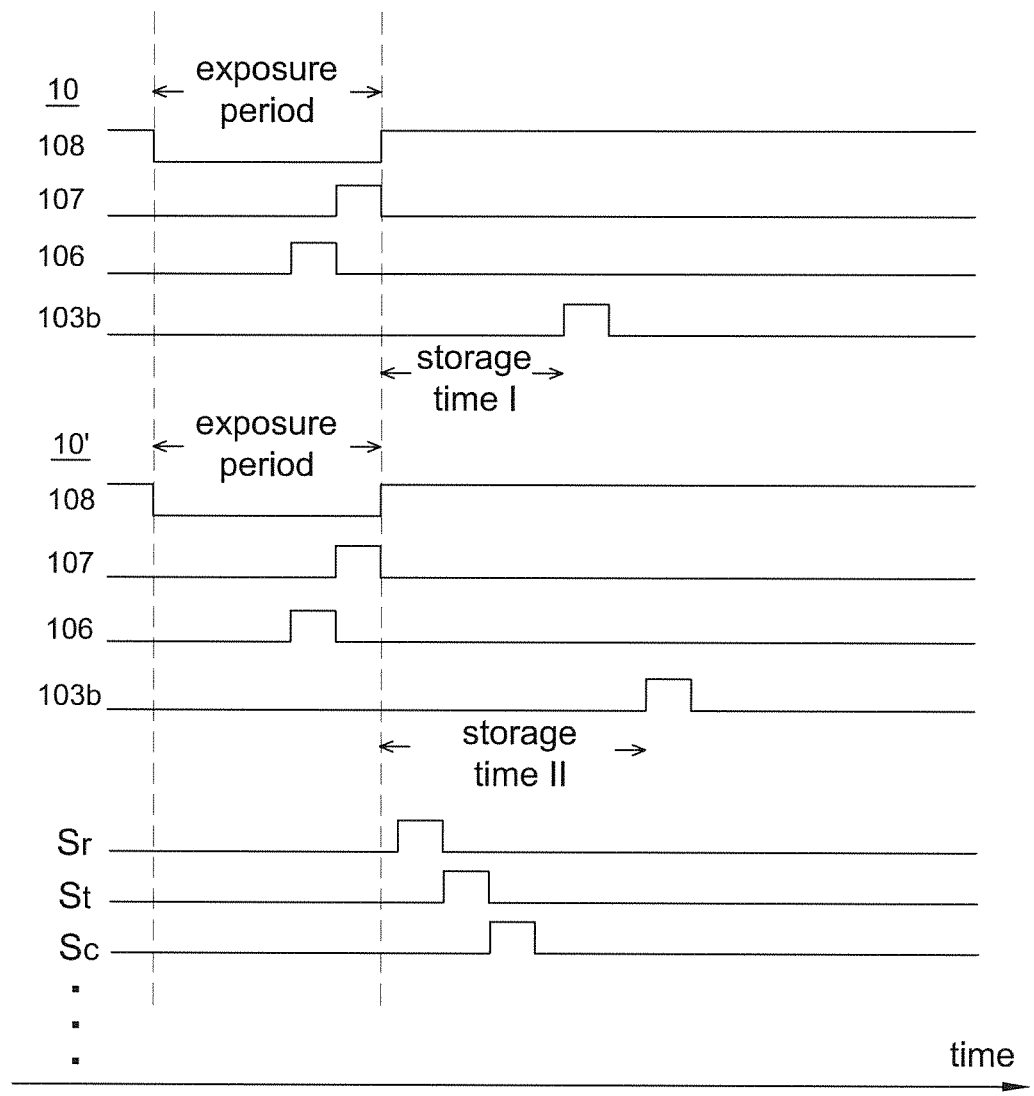
FIG. 10 is a signal timing diagram of the imaging system of FIG. 9.

Referring to FIG. 10, it is a signal timing diagram of the optoelectronic conversion circuits 10 and 10' of FIG. 9. Referring to FIGS. 9 and 10 together, each optoelectronic conversion circuit 10 (or 10') includes a first gate 103a, a second gate 103b, a third gate 106, a fourth gate 107, a fifth gate 108, an optoelectronic element 101 and a pixel capacitor 102. The first gate 103a is a source follower transistor. The second gate 103b is used to control the charge amount Q stored in the pixel capacitor 102 to be outputted to the bit line 70. The third gate 106 is a reset transistor. The fourth gate 107 is coupled between the optoelectronic element 101 and the pixel capacitor 102, and configured to control the photocurrent $I_L$ converted by the optoelectronic element 101 to be stored in the pixel capacitor 102 to generate the charge amount Q. The fifth gate 108 is configured to control an effective exposure time of the optoelectronic element 101. Details of the optoelectronic conversion circuit 10 (or 10') are described above and thus details thereof are not repeated again.

FIG. 10 shows that the optoelectronic conversion circuit 10 stores the charge amount Q for a storage time I and the optoelectronic conversion circuit 10' stores the charge amount Q for a storage time II. In this embodiment, the read circuit 61 does not automatically read the charge amount Q from the sensing pixel (e.g., the optoelectronic conversion circuits 10 and 10') of the sensor array, but reads the charge amount Q after the timing control 63 receives a trigger signal St from the serial interface 65 and sends at least one control signal Sc, wherein the at least one control signal Sc further includes, for example, a conducting signal of the second gate 103b to allow the read circuit 61 to read the charge amount Q from the pixel capacitor 102 via the bit line 70. As mentioned above, the amount of charges stored in different optoelectronic conversion circuits of the sensor array are not necessary to be identical.

The serial interface 65 is coupled between the timing control 63 and the host 8, and configured to send image data Si to the host 8 and send a trigger signal St to the timing control 63 after receiving the read request Sr from the host 8, and the trigger signal St activates the timing control 63 to send the at least one control signal Sc to the read circuit 61.

In this embodiment, the serial interface 65 includes, for example, a plurality of flip-flops 651 configured to store the image data Si. A number of the flip-flops 651 is, for example, less than 1% of a total pixel number of the sensor array. In one embodiment, a number of the flip-flops 651 does not exceed a column number of sensing pixel columns or a row number of sensing pixel rows of the sensor array, e.g., 8 columns and 6 rows being shown in FIG. 8.

The timing control 63 is coupled between the read circuit 61 and the serial interface 65, and configured to send at least one control signal Sc after receiving the trigger signal St from the serial interface 65, and the at least one control signal Sc is to control the optoelectronic conversion circuit 10 to store a charge amount Q and control the read circuit 61 to read the charged amount Q stored in the optoelectronic conversion circuit 10 to the serial interface 65 to be configured as the image data Si.

The read circuit 61 is, for example, a double correlated sampling (DCS) circuit, and coupled to the sensor array via a plurality of bit lines 70. For example, the read circuit 61 is coupled to every optoelectronic conversion circuit 10 of each sensing pixel column via one bit line 70.

In this embodiment, as the serial interface 65 does not include a digital buffer for storing a whole digital image frame, the image data Si is temporarily stored in pixel capacitors 102 of the optoelectronic conversion circuits 10 by a form of analog data. Meanwhile, the read circuit 35 does not read the charge amount Q stored in the pixel capacitors 102 of the sensor array to the flip-flops 651 of the serial interface 65 before the serial interface 65 receives the read request Sr and sends the trigger signal St. After receiving the control signal Sc from the timing control 63, the read circuit 61 reads the charge amount Q of a part of sensing pixels of the sensor array to the flip-flops 651 of the serial interface 65 to be configured as the image data Si, wherein said "a part of sensing pixels" is referred to that a number of the sensing pixels being read does not exceed a number of the flip-flops 651 and is far smaller than a total pixel number of the sensing pixels in the sensor array.

The analog to digital converter (ADC) 35 is coupled between the read circuit 61 and the serial interface 65, and configured to convert the charge amounts Q read by the read circuit 61 to digital signals. It should be mentioned that although FIGS. 8 and 9 show that the ADC 35 is outside the read circuit 61 and the serial interface 65, FIGS. 8 and 9 are only intended to illustrate but not to limit the present disclosure. In some embodiments, the ADC 35 is included in the read circuit 61 or the serial interface 65 without particular limitations.

Figure 11:
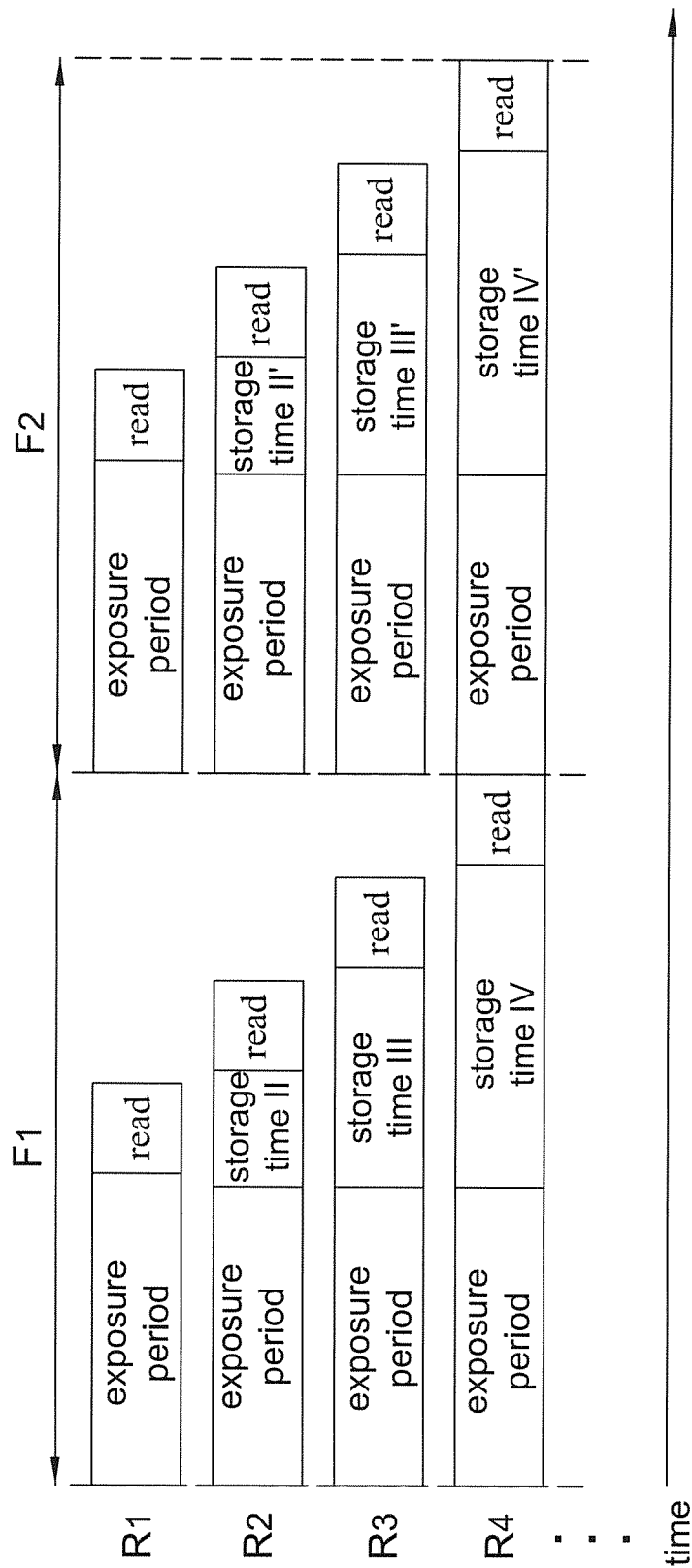
FIG. 11 is an operational schematic diagram of the imaging system of FIG. 8.

Referring to FIG. 11, it is an operational schematic diagram of the imaging system 4' of FIG. 8. FIG. 8 shows that the image sensor 1' captures two successive image frames, e.g., a first frame F1 and a second frame F2. For illustration purposes, FIG. 11 shows operations of 4 sensing pixel rows (e.g., R1 to R4) of the sensor array, and it is assumed that signal timings of all sensing pixels in the same sensing pixel row are identical. However, it should be mentioned that FIG. 11 is only intended to illustrate but not to limit the present disclosure. In some embodiments, when a number of flip-flops 651 in the serial interface 65 is less than a pixel number of sensing pixels in one sensing pixel row (or column), the signal timings of the sensing pixels in one sensing pixel row are different from one another.

For illustration purposes, it is assumed in FIG. 11 that a number of flip-flops 651 in the serial interface 65 is equal to a pixel number of sensing pixels in one sensing pixel row, and it is also assumed that the charge amount Q of a first row of sensing pixels is automatically readout and stored in the flip-flops 651 of the serial interface 65 when the exposure of the sensor array is over (e.g., FIG. 11 showing the global shutter operation). It should be mentioned that the "automatically readout" mentioned above is referred to that the charge amount Q is read before the host 8 sends the read request Sr and before the serial interface 65 sends the trigger signal St. Accordingly, FIG. 11 shows that the charge amount Q of the first row of sensing pixels R1 is not temporarily stored in the pixel capacitor 102 thereof, but the present disclosure is not limited thereto. In other embodiments, the charge amounts Q of the first row of sensing pixels R1 are read only after the read circuit 61 receives the control signal Sc, as shown in FIG. 10. It should be mentioned that although the global shutter operation is shown herein, the present disclosure is also adaptable to the rolling shutter operation.

The sensor array sequentially outputs a first frame F1 and a second frame F2. As mentioned above, the sensor array includes a plurality of optoelectronic conversion circuits 10 each stores a first charge amount for a first storage time corresponding to the first frame F1 and stores a second charge amount for a second storage time corresponding to the second frame F2, wherein the first charge amount and the second charge amount are formed by accumulating the photocurrent $I_L$ in the pixel capacitor 102. For example in FIG. 11, an optoelectronic conversion circuit in the sensing pixel row R2 stores a first charge amount for a first storage time II corresponding to the first frame F1 and stores a second charge amount for a second storage time II' corresponding to the second frame F2; an optoelectronic conversion circuit in the sensing pixel row R3 stores a first charge amount for a first storage time III corresponding to the first frame F1 and stores a second charge amount for a second storage time III' corresponding to the second frame F2; and so on. It is appreciated that said first charge amount and the second charge amount are identical to or different from each other.

As a time point that the host 8 is ready to receive the image data Si is not fixed, the read circuit 61 does not read the first charge amount or the second charge amount stored in the optoelectronic conversion circuit 10 to the serial interface 65 before the serial interface 65 sends the trigger signal St such that it is possible that the first storage time is not equal to the second storage time, e.g., the first storage time II not equal to the second storage time II'; the first storage time III not equal to the second storage time III'; and so on.

In this embodiment, the serial interface 65 sends, after receiving the read request Sr from the host 8, a trigger signal to the timing control 63 respectively corresponding to the first frame F1 and the second frame 2 to activate the timing control 63 to send a control signal Sc respectively corresponding to the first frame F1 and the second frame 2 thereby controlling the read circuit 61 to readout the first charge amount and the second charge amount stored in the optoelectronic conversion circuit 10. After the read circuit 61 reads the first charge amount corresponding to the first frame F1 and reads the second charge amount corresponding to the second frame F2, the ADC 35 converts the first charge amount and the second charge amount into digital signals. The digital signals are served as the image data Si stored in the flip-flops 651 of the serial interface 65 and waited to be sent to the host 8 later.

In this embodiment, it is possible that the host 8 reads the image data Si in the flip-flops 651 of the serial interface 65 on occasion without continuously reading the whole image data sensed by the sensor array at once.

In other words, the first storage time and the second storage time are determined by the trigger signal St. If a trigger signal St is sent earlier, the storage time is shorter; whereas if a trigger signal St is sent later, the storage time is longer.

In other words, in this embodiment the storage times, which are determined by the time of the host 8 sending the read request Sr, of at least a part of sensing pixels of the sensor array for storing the associated charge amount are different from one another corresponding to two successive image frames.

It should be mentioned that values mentioned in the above embodiments are only intended to illustrate but not to limit the present disclosure.

As mentioned above, the conventional image sensor uses two digital image frames (one corresponding to a light source and ambient light and the other corresponding to the ambient light only) to perform a differential operation to eliminate noise due to the ambient light and thus the power consumption is high. Therefore, the present disclosure provides an image sensor (e.g. FIGS. 2 and 3) and an operating method thereof (e.g. FIGS. 3 and 7) that may directly compare, by timing control, a first charge associated with a light source and ambient light with a second charge only associated with the ambient light so that noise due to the ambient light is eliminated and without increasing the power consumption.

Although the disclosure has been explained in relation to its preferred embodiment, it is not used to limit the disclosure. It is to be understood that many other possible modifications and variations can be made by those skilled in the art without departing from the spirit and scope of the disclosure as hereinafter claimed.

What is claimed is:

1. An imaging system comprising:
   a host configured to send a read request;
   a serial interface configured to send image data to the host and send a trigger signal when receiving the read request;
   a sensor array configured to store a plurality of charge amounts;
   a read circuit coupled to the sensor array via a plurality of bit lines; and
   a timing control configured to send, after receiving the trigger signal, a control signal to control the read circuit to read the charge amounts stored in the sensor array to the serial interface to be configured as the image data,
   wherein the serial interface comprises a plurality of flip-flops configured to store the image data, and a number of the flip-flops does not exceed a number of sensing pixel columns of the sensor array.

2. The imaging system as claimed in claim 1, wherein the sensor array comprises a plurality of sensing pixels, and each of the sensing pixels comprises:
   an optoelectronic element configured to convert incident light into photocurrent; and
   a pixel capacitor configured to store the photocurrent as the charge amount.

3. The imaging system as claimed in claim 1, further comprising an analog to digital converter coupled between the read circuit and the serial interface, and configured to convert the charge amounts read by the read circuit into digital signals.

4. The imaging system as claimed in claim 1, wherein the sensor array comprises a plurality of sensing pixels, and storage times of at least a part of the sensing pixels for storing the associated charge amounts are different corresponding to two successive image frames.

5. An imaging system comprising:
   a host configured to send a read request;
   a serial interface configured to send image data to the host and send a trigger signal when receiving the read request;
   a sensor array configured to store a plurality of charge amounts;
   a read circuit coupled to the sensor array via a plurality of bit lines; and
   a timing control configured to send, after receiving the trigger signal, a control signal to control the read circuit to read the charge amounts stored in the sensor array to the serial interface to be configured as the image data,
   wherein the serial interface comprises a plurality of flip-flops configured to store the image data, and a number of the flip-flops is less than 1% of a pixel number of the sensor array.

6. The imaging system as claimed in claim 5, wherein the sensor array comprises a plurality of sensing pixels, and each of the sensing pixels comprises:
   an optoelectronic element configured to convert incident light into photocurrent; and
   a pixel capacitor configured to store the photocurrent as the charge amount.

7. The imaging system as claimed in claim 5, further comprising an analog to digital converter coupled between the read circuit and the serial interface, and configured to convert the charge amounts read by the read circuit into digital signals.

8. The imaging system as claimed in claim 5, wherein the sensor array comprises a plurality of sensing pixels, and storage times of at least a part of the sensing pixels for storing the associated charge amounts are different corresponding to two successive image frames.

9. An imaging system comprising:
   a host configured to send a read request;
   a serial interface configured to send image data to the host and send a trigger signal when receiving the read request;
   a sensor array configured to store a plurality of charge amounts;
   a read circuit coupled to the sensor array via a plurality of bit lines; and
   a timing control configured to send, after receiving the trigger signal, a control signal to control the read circuit to read the charge amounts stored in the sensor array to the serial interface to be configured as the image data,
   wherein the serial interface comprises a plurality of flip-flops, and the read circuit reads the charge amounts of a part of the sensing pixels of the sensor array to the flip-flops to be configured as the image data when receiving the control signal.

10. The imaging system as claimed in claim 9, wherein the sensor array comprises a plurality of sensing pixels, and each of the sensing pixels comprises:
    an optoelectronic element configured to convert incident light into photocurrent; and
    a pixel capacitor configured to store the photocurrent as the charge amount.

11. The imaging system as claimed in claim 9, further comprising an analog to digital converter coupled between the read circuit and the serial interface, and configured to convert the charge amounts read by the read circuit into digital signals.

12. The imaging system as claimed in claim 9, wherein the sensor array comprises a plurality of sensing pixels, and storage times of at least a part of the sensing pixels for storing the associated charge amounts are different corresponding to two successive image frames.

13. An imaging system comprising:
   a host configured to send a read request;
   a serial interface configured to send image data to the host and send a trigger signal when receiving the read request;
   a sensor array configured to store a plurality of charge amounts;
   a read circuit coupled to the sensor array via a plurality of bit lines; and
   a timing control configured to send, after receiving the trigger signal, a control signal to control the read circuit to read the charge amounts stored in the sensor array to the serial interface to be configured as the image data, wherein the serial interface comprises a plurality of flip-flops, and the read circuit does not read the charge amounts stored in the sensor array to the flip-flops before the serial interface receives the read request.

14. The imaging system as claimed in claim 13, wherein the sensor array comprises a plurality of sensing pixels, and each of the sensing pixels comprises:
   an optoelectronic element configured to convert incident light into photocurrent; and
   a pixel capacitor configured to store the photocurrent as the charge amount.

15. The imaging system as claimed in claim 13, further comprising an analog to digital converter coupled between the read circuit and the serial interface, and configured to convert the charge amounts read by the read circuit into digital signals.

16. The imaging system as claimed in claim 13, wherein the sensor array comprises a plurality of sensing pixels, and storage times of at least a part of the sensing pixels for storing the associated charge amounts are different corresponding to two successive image frames.

* * * * *